(12) United States Patent
Ferner et al.

(10) Patent No.: US 11,220,453 B2
(45) Date of Patent: Jan. 11, 2022

(54) COLOR-STABLE, ANTIMICROBIAL, POROUS GLASS POWDER AND PROCESS FOR PRODUCING SUCH A POWDER AT HIGH TEMPERATURES AND USE THEREOF

(71) Applicant: TROVOTECH GMBH, Bitterfeld-Wolfen Ot Wolfen (DE)

(72) Inventors: Uwe Ferner, Bitterfeld-Wolfen Ot Bobbau (DE); Hans-Juergen Voss, Voerstetten (DE); Hans-Udo Lugner, Bitterfeld-Wolfen (DE)

(73) Assignee: TROVOTECH GmbH, Bitterfeld-Wolfen Ot Wolfen (DE)

(*) Notice: Subject to any disclaimer, the term of this patent is extended or adjusted under 35 U.S.C. 154(b) by 300 days.

(21) Appl. No.: 16/091,633

(22) PCT Filed: Apr. 5, 2017

(86) PCT No.: PCT/EP2017/000423
§ 371 (c)(1),
(2) Date: Oct. 5, 2018

(87) PCT Pub. No.: WO2017/174190
PCT Pub. Date: Oct. 12, 2017

(65) Prior Publication Data
US 2019/0152840 A1    May 23, 2019

(30) Foreign Application Priority Data

Apr. 5, 2016   (DE) .................... 10 2016 003 868.3

(51) Int. Cl.
| | | |
|---|---|---|
| C03C 11/00 | (2006.01) | |
| C03C 21/00 | (2006.01) | |
| C03C 4/02 | (2006.01) | |
| A01N 59/16 | (2006.01) | |
| C03B 19/10 | (2006.01) | |
| C09D 7/40 | (2018.01) | |
| C08K 7/28 | (2006.01) | |
| C03C 12/00 | (2006.01) | |
| C09D 5/14 | (2006.01) | |
| C03C 3/118 | (2006.01) | |
| C08K 9/02 | (2006.01) | |
| C08K 3/40 | (2006.01) | |

(52) U.S. Cl.
CPC ............ *C03C 11/007* (2013.01); *A01N 59/16* (2013.01); *C03B 19/108* (2013.01); *C03C 3/118* (2013.01); *C03C 4/02* (2013.01); *C03C 12/00* (2013.01); *C03C 21/005* (2013.01); *C08K 7/28* (2013.01); *C08K 9/02* (2013.01); *C09D 5/14* (2013.01); *C09D 7/69* (2018.01); *C03C 2201/08* (2013.01); *C03C 2201/24* (2013.01); *C03C 2201/30* (2013.01); *C03C 2204/02* (2013.01); *C08K 3/40* (2013.01); *C08K 2201/005* (2013.01)

(58) Field of Classification Search
CPC ..... C03C 11/007; C03C 12/00; C03C 21/005; C03C 2204/02; C08K 7/28
USPC ................................. 428/402, 426
See application file for complete search history.

(56) References Cited

U.S. PATENT DOCUMENTS

| | | | | |
|---|---|---|---|---|
| 10,517,300 | B2* | 12/2019 | Campbell, Jr. ........ | A01N 59/16 |
| 10,959,434 | B2* | 3/2021 | Jiang .................... | A41D 31/30 |
| 2003/0084683 | A1* | 5/2003 | Dejaiffe ................ | C03C 11/007 65/17.5 |
| 2008/0190140 | A1* | 8/2008 | Selig ..................... | C03B 19/08 65/22 |
| 2008/0287574 | A1* | 11/2008 | Loth ..................... | C09D 7/69 524/35 |
| 2008/0293872 | A1* | 11/2008 | Loth ..................... | C09J 4/00 524/494 |
| 2010/0004111 | A1* | 1/2010 | Kobayashi ............ | A01N 59/16 501/32 |
| 2010/0071415 | A1* | 3/2010 | Voss .................... | C03C 21/00 65/22 |
| 2010/0196487 | A1* | 8/2010 | Voss .................... | A01N 59/16 424/489 |
| 2015/0018453 | A1* | 1/2015 | Hans-Juergen ........ | C08K 7/28 523/219 |

FOREIGN PATENT DOCUMENTS

| | | |
|---|---|---|
| WO | 2005108316 A1 | 11/2005 |
| WO | 2009036862 A2 | 3/2009 |

* cited by examiner

Primary Examiner — Lauren R Colgan
(74) Attorney, Agent, or Firm — Laurence A. Greenberg; Werner H. Stemer; Ralph E. Locher

(57) ABSTRACT

A color-stable, antimicrobial glass powder obtained by partial ion exchange at a temperature of 300° C. to 350° C. and an exchange time of 1 to 120 minutes, is formed of a mixture of porous glass particles having micropores and macropores made of borosilicate glass continuously foamed by extrusion having a $Fe_2O_3$ content <0.2 wt %, in which the obtained glass foam is subsequently comminuted by dry grinding to average particle sizes of 1.0 to 8.0 μm. The mixture includes color stabilizers containing 0.1% to 0.2% of ammonium ions and antimicrobial metal ions from dissolved metal salts, wherein the metal ions may be silver and/or zinc and/or copper ions. A method for the production of a color-stable, antimicrobial glass powder and applications for using the color-stable, antimicrobial glass powder are also provided.

10 Claims, No Drawings

COLOR-STABLE, ANTIMICROBIAL, POROUS GLASS POWDER AND PROCESS FOR PRODUCING SUCH A POWDER AT HIGH TEMPERATURES AND USE THEREOF

BACKGROUND OF THE INVENTION

Field of the Invention

The invention relates to a color-stable, antimicrobial glass powder obtained by partial ion exchange of ammonium ions at a temperature of production higher than 300° C. Ammonium ions which are used as color stabilizers have so far only been described in production processes under a temperature range between 90° C. and 110° C.

The invention furthermore relates to polymers, silicones, paints, plasters or cosmetic products as well as moulded parts, film and fibers produced from the polymers equipped with the color-stable, antimicrobial, porous glass powder.

It has been known for a long time that metal ions, specifically silver, copper and zinc ions, have antimicrobial properties.

A number of developments aimed at controlling the release of silver ions in order to achieve a prompt, short-term antimicrobial effect, but also long-term effects of this kind.

For example, surfaces were enlarged by the use of silver nanoparticles in order to improve the release of silver ions, or substrates were used where the silver was already partially existing in ionic form.

There were some descriptions of soluble glasses containing silver ions and coating materials of silver particles where the silver ion release could be controlled.

The carriers used were zeolites, layered silicates, calcium phosphate, zirconium phosphate, aluminium phosphate, soluble glass, titanium oxide or such materials.

It is known that silver nanoparticles have been used, such as are described in DE 101 46 050 A1 for adhesives and coating substances, for example.

Today, the use of silver nanoparticles is no longer regarded as not being a health risk. Furthermore, silver nanoparticles are not listed by the ECHA as biocide agents in the Article 95 List pursuant to the Biocide Product Directive 528/2012 and may therefore no longer be commercialised in the EU with effect from 1 Sep. 2015. Silver phosphate glass is however listed as a biocide agent in the Article 95 List; this group also includes zinc, borate, silicate glasses.

DE 10 2004 008 931 A1 claims the use of porous glasses, glass ceramics, glass powders or glass ceramic powders in cosmetic and medical biocide formulations.

For example, the claims include the use of porous glass powders having an average pore diameter of 0.0005 µm to 500 µm and an average particle size of 500 nm to 500 µm and a ratio of pore diameter to particle size of <0.2 with or without filling in biocides or as biocides.

The porous glass can be produced for this purpose for example by a metal-organic or anorganic sol-gel process, by a phase separation by tempering with subsequent elution of a phase, and by a sintering process.

The porous glasses described above are not produced from glass foam produced with a high-temperature extruder, however. These glass compounds are of a different nature and they are not provided with a color stabilizer as additive.

The patents DE 20 2005 006 784 U1 and DE 10 2005 013 857 A1 claim transparent porous sol-gel layers containing at least one substance with an antimicrobial effect, where the substance with an antimicrobial effect is said to be contained as nanoparticles.

The preferred version is an antimicrobial glass or glass ceramic nanopowder containing silver, zinc or copper oxide. DE 10 2005 013 857 A1 furthermore claims a method for its production and use.

The use of silver in phosphatous, readily soluble glasses is also well known. For example, patent U.S. Pat. No. 6,593,260 B2 describes the use of argentiferous phosphate glasses to equip fibers, yarns and fabrics antibacterially. The glass raw materials contain silver oxide which is blended into them, however.

DE 101 38 568 A1 describes the use of a phosphorous silicate glass interstitially provided with Ag, Cu and/or Zn ions in polyesters. The metal ions are exclusively liberated here by the dissolution of the glass.

The patents described above use silver in the one or other form as antimicrobial agent, but they do not use color stabilizers.

The patent DE 38 77 801 T2 claims an abiotic resin composition, consisting of a resin, at least one abiotic zeolite and at least one further discoloration inhibitor which is not contained in the zeolite.

By the exchange of ions, the zeolite is provided with ammonium ions, which can be exchanged as ions, as a color stabilizer by fully or partially replacing the ions existing in the zeolite by ammonium ions and antibiotic metal ions. This ion exchange is obtained by moistening an ammonium nitrate solution and a silver nitrate solution on the zeolite, and then tempering it at a temperature of 10° C. to 70° C., preferably 40° C. to 60° C. for 3 to 24 hours, preferably 10 to 24 hours.

DE 10 2004 022 779 B4 includes a description of the production of antimicrobial glass by means of an extruder. In this process, antimicrobial glasses or well-known basic materials are liquefied in the extruder and mixed and foamed with other heavy metals or agents with an antimicrobial effect.

This patent also does not mention any color stabilizers as an additional additive during the production process.

The patent DE 10 2006 026 033 A1 contains a description of the production of antimicrobial or antibacterial, flaky glass particles made from glass foam. During the process, closed-pored or open-pored glass foams are generated in the extruder, which are then crushed. The glass particles obtained through the crushing process are said to become antimicrobial or antibacterial through a subsequent ion exchange, or that the ion exchange process will enhance their antimicrobial or antibacterial effect.

No glass composition is mentioned, neither is any mention made of the adding of ammonium compounds as color stabilizers. The glass particles are said to be flaky, and no mention is made of any discoloration.

Precious metals, such as silver, copper, gold and their bonds achieve a good antimicrobial effect due to their oligodynamic effect.

Although the biocide agent and/or biocide product has a good long-term antimicrobial effect, it has a distinct color and/or may lead to discoloration in applications, which is a disadvantage of most antimicrobial equipment containing precious metals, such as, to some extent, the porous glass particles obtained by high temperature extrusion and doped with silver ions, so that the use of such agents and biocide product is considerably limited.

Where many antimicrobial silver products are used, the polymers, paints or plasters equipped with them will change color. This is caused by the oxidation of the silver ions to silver oxide, or by the reaction of silver ions with other components of the application.

Well-known dispersion paints have shown in the field test that they heavily discolor.

BRIEF SUMMARY OF THE INVENTION

The task was therefore to develop an antimicrobial, porous glass powder which eliminates the disadvantages presented by the described state of the art and specifically achieves stability of the color, while using only a small quantity of color stabilizer, and which can be produced with a profitable process.

It was found that this task shall be solved with antimicrobial, porous glass particles made of borosilicate glass having a $Fe_2O_3$ content less than 0.2 wt %, which are doped with metal ions, such as silver and/or zinc and/or copper ions and ammonium ions.

You can also use other metals, such as cerium, germanium or tellurium. During the process, you can interstitially compound the metal ions in the glass matrix and/or the pores of the glass particles via ion exchange.

The fact that the metal ions with their antimicrobial effect are liberated from the pores of the glass particles results in a good short-term effect, and with metal ions dispersed deeper in the pores and in the glass matrix you can even achieve a distinctly long-term antimicrobial effect.

The tests carried out to make this evident prove that an antimicrobial effect was achieved.

This antimicrobial effect has been verified by independent testing institutions, showing the following results, among others (Table 1):

The porosity of the glass particles leads to them absorbing an aqueous solution from the metal salts and the bond that liberates ammonium ions. This is followed by a thermal treatment in order to partially exchange the metal ions, preferably silver ions, and the ammonium ions with the sodium ions of the glass particles, and to fix them to the pore walls of the glass particles via ion bonds.

Below there is an observation of the borosilicate glass particles doped with silver, but for which you can also use other heavy metals, specifically zinc and copper.

If you use silver salts, the silver content of the porous glass particles should be 0.1 to 10 wt %, preferably 0.5 to 5 wt %, after thermal treatment.

The porous glass particles doped with silver are characterized by a prompt release of the antimicrobial silver ions from the open pores of the glass particle surface for the short-term effect, and a diffuse release of the silver ions from the glass matrix and/or from the deeper pores of the glass particles for the antimicrobial long-term effect.

The color-stable, porous, antimicrobial glass particles loaded with silver ions should not be used in applications containing free sulphur or chlorine ions. In such cases, there is a reaction with the silver ions and the formation of insoluble or hardly soluble argentite or silver chloride, diminishing or preventing any antimicrobial effect.

You can use as a source of ammonium ions preferably water-soluble salts, such as ammonium nitrate, ammonium acetate or ammonium sulphate.

The preferential use is that of ammonium nitrate ($NH_4NO_3$), a salt which is generated by the neutralisation of ammonia with nitric acid and can be easily solved in water.

TABLE 1

*Bacillus* reduction findings by "Dr. Weßling Laboratorien GmbH", Test Report No. 6W5257 dated 25 Apr. 2006

KBE/ml suspension in the assay, depending on the incubation period

| Examples (0.1 mass % in water) | Incubation time | *Staphylococcus aureus* Bacteria | *Enterococcus hirae* gram positive | *Pseudomona aeruginosa* Bacteria | *Escherichia coli* gram negative | *Candida albicans* Yeast fungus | *Aspergillus niger* Mould fungus |
|---|---|---|---|---|---|---|---|
| Zero sample | 0 h | $3.5 \times 10^4$ | $4.9 \times 10^6$ | $4.7 \times 10^6$ | $5.1 \times 10^4$ | $1.3 \times 10^4$ | $1.0 \times 10^5$ |
| TROVO ® powder K3 without silver | 24 h | $6.3 \times 10^4$ | $2.4 \times 10^6$ | $1.0 \times 10^7$ | $1.0 \times 10^6$ | $2.4 \times 10^4$ | $1.5 \times 10^4$ |
| | 48 h | $1.2 \times 10^5$ | $4.0 \times 10^6$ | >107 | >$10^6$ | $2.4 \times 10^5$ | $1.2 \times 10^4$ |
| | 7 d | >$10^6$ | $1.2 \times 10^7$ | $7.2 \times 10^7$ | >$10^6$ | $4.0 \times 10^5$ | $1.8 \times 10^4$ |
| | 14 d | >$10^6$ | $8.0 \times 10^6$ | $1.0 \times 10^8$ | >$10^6$ | $1.0 \times 10^6$ | $2.8 \times 10^4$ |
| | 28 d | >$10^7$ | $9.3 \times 10^6$ | >$10^8$ | >$10^7$ | $4.0 \times 10^6$ | $1.4 \times 10^4$ |
| TROVO ® guard K3-2 | 0 d | $3.5 \times 10^4$ | $4.9 \times 10^6$ | $4.7 \times 10^6$ | $5.1 \times 10^4$ | $1.3 \times 10^4$ | $1.0 \times 10^5$ |
| | 1 d | $1.0 \times 10^4$ | $1.6 \times 10^6$ | <100 | <10 | $4.0 \times 10^3$ | $2.2 \times 10^4$ |
| | 2 d | $2.4 \times 10^3$ | $1.6 \times 10^6$ | <10 | <10 | $2.0 \times 10^3$ | $1.3 \times 10^4$ |
| | 7 d | 90 | $1.0 \times 10^4$ | <10 | <10 | 130 | $2.2 \times 10^3$ |
| | 14 d | <10 | 150 | <10 | <10 | 10 | 100 |
| TROVO ® guard K3-5 | 28 d | <10 | <10 | <10 | <10 | <10 | <10 |
| | 0 d | $3.5 \times 10^4$ | $4.9 \times 10^6$ | $4.7 \times 10^6$ | $5.1 \times 10^4$ | $1.3 \times 10^4$ | $1.0 \times 10^5$ |
| | 1 d | $3.0 \times 10^3$ | $6.0 \times 10^5$ | <100 | 20 | $3.0 \times 10^3$ | $1.3 \times 10^4$ |
| | 2 d | $3.0 \times 10^3$ | $1.0 \times 10^6$ | <10 | <10 | $4.0 \times 10^3$ | $3.0 \times 10^3$ |
| | 7 d | 40 | 500 | <10 | <10 | 120 | $2.2 \times 10^{43}$ |
| | 14 d | <10 | <10 | <10 | <10 | 10 | 140 |

When the glass particles are doped with metal ions, ammonium ions are used as color stabilizers in order to prevent the discoloration of the doped glass particles and the applications at a later time.

The borosilicate glasses used here should have a lower content of $Fe_2O_3$ as this ingredient alone leads to a yellow and brown discoloration of the glass.

The source of the silver ions may preferably be water-soluble silver compounds, such as silver nitrate, silver sulphate, silver perchlorate, diamine silver nitrate and silver acetate.

As a source for copper ions, you can preferably use copper bonds, such as copper(II) nitrate, coppersulphate, copper perchlorate, copper acetate and potassium tetracyanocuprate.

As a source for zinc ions, you can preferably use zinc bonds, such as zinc nitrate, zinc chlorate, zinc thiocyanate and zinc acetate.

As a source of other metals, you can preferably use appropriate soluble salts.

The color-stable, porous and antimicrobial glass powder can be used in polymer moulding compounds, silicone sealing agents, plasters, paints or cosmetic products with 0.1 to 20 wt %, preferably 0.1 to 5.0 wt %, specifically preferably 0.2 to 2.0 wt % in order to achieve an antimicrobial equipment.

Polymer moulding compounds in the meaning of the invention that can be equipped with the color-stable, porous and antimicrobial glass powder are homopolymers and copolymers of olefinically unsaturated monomers, such as polyfluor ethylene, polypropylene, ethylene/propylene copolymers, polystyrenes, styrene/acrylonitrile copolymers, ABS resins, vinyl chloride homopolymers and copolymers, polyacrylates, vinyl acetate copolymers such as ethylene-vinylacetate, polyacetates, polycarbonates, polyester and specifically polyamides.

The invention is furthermore deemed to include compounds of two or more of the thermoplastic moulding compounds.

Preferable use is to be made of polymer moulding compounds whose mixture absorption is ≥0.2 wt % at 23° C. and a relative humidity of 50%.

Polymer moulding compounds of a lower absorption of humidity only achieve their antimicrobial effect with fibers of a very tiny diameter (up to maximum 20 μm) or in film of a minute thickness (up to max. 30 μm). The large specific surface available in these cases, and the color-stable, antimicrobial, porous glass particles are located on the surface or near the surface so that the release of the metal ions with their antimicrobial action is possible without absorbing humidity.

The components to be included in the thermoplastic moulding compounds of the invention may be polymerisates which have the elastic characteristics of rubber. Preference is to be given to the so-called ethylene-propylene rubbers and/or ethylene-propylene diene rubbers (EPM and EPDM rubbers). EPM and EPDM rubbers can preferably be grafted with reactive carbonic acids or their derivates.

Other additives may be included in the thermoplastic moulding compounds, such as flame retardants, plasticizers, nucleation agents, antistatic agents, demoulding and slip additives, solvents and auxiliary products, oxidation inhibitors, heat and light stabilizers, coloring agents, pigments, coupling agents, such as a number of silanes, antidripping products such as polytetrafluoroethylene, dispersion additives such as ethylene glycol, propane-1,2-diol or propane-1,3-diol.

The components to be included in the thermoplastic moulding compounds may be fillers and reinforcing agents, such as glass fibers (milled, long and continuous fibers), glass spheres, glass powder, glass fabric, glass fibre mats, talcum, felspar, quarz, glimmer, kaoline, chalk, calcium carbonate, magnesium carbonate, titanium oxide, silicates such as wollastonite, layered silicates, clay minerals such as for ex. bentonite, montmorillonites, hectorites, saponites, precipitated, pyrogenic, cristalline or amorphous silicic acid, metal oxides and metal hydroxides, barite, fibers or flours of natural products, synthetic fibers, carbon fibers, aramide fibers, soot and graphite, without limiting the list of other fillers. The fillers and reinforcing materials may also be surface-treated.

Silicone sealing agents include acetate systems, amine/aminoxy systems, oxime systems, benzamide systems and alkoxy systems.

You can easily achieve an antimicrobial effect in plasters open to diffusion, such as mineral plasters on the basis of lime, gypsum or cement, silicate resin or silicone resin.

Paints may include façade paints, such as silicone resin paints, dispersion silicate paints, pure acrylate paints, dispersion acrylate paints or silicatized dispersion paints.

Paints may include inside wall paints, such as silicate paints, casein paints or latex paints.

The porous glass particles are made from glass foam. For this purpose, glass pellets are melted in a founding hopper, the resulting molten mass then being introduced into an extruder, preferably a single-screw extruder, under hydrostatic pressure. The molten glass mass is mixed with water vapour as leavening agent in the extruder under pressures of between 800° C. and 1000° C. The leavening agent to be used consists of 1 to 5 grams of vapour, preferably 2 to 4 grams, per kilogram of molten glass.

This process makes use of pellets of a borosilicate glass of the chemical composition presented in Table 2.

TABLE 2

Chemical Composition of the Borosilicate Glass

| Oxides | Contents in wt % |
| --- | --- |
| $Na_2O$ | 9.5-13.5 |
| $K_2O$ | 1.0-4.0 |
| MgO | 0-2.0 |
| CaO | 1.0-5.0 |
| $Al_2O_3$ | 4.0-7.0 |
| $SiO_2$ | 55.0-60.0 |
| $B_2O_3$ | 8.0-11.0 |
| $Fe_2O_3$ | <0.2 |
| ZnO | 2.0-5.0 |
| BaO | 3.0-6.0 |
| $F_2$ | <1.0 |

The determination of the chemical glass composition (ISO 52340) is made via atomic absorption spectroscopy (AAS) or X-ray fluorescent analysis.

For this composition of glass, the specifically preferred processing temperature in the single-screw extruder in the individual heating zones is 850 to 920° C.

The borosilicate glass to be used should have a content of less than 0.2 wt % as the ferrum contents alone will result in a discoloration of the glass particles produced from it.

The mixture of molten glass and leavening agent is then being annealed at the extruder exit nozzle of a diameter of 2 to 5 mm, and a fine-pored glass foam of a density of 0.05 to 0.30 g/cm$^3$, preferably 0.10 to 0.20 g/cm$^3$ is being generated.

The extruded glass foam is not annealed, but chilled down by the effect of the ambient air. It consists of closed pores, which may partly break open due to the rapid cooling. This results in the glass foam slab falling apart in irregular pieces.

As a next step, the irregular pieces are coarse-crushed in a roll type crusher with a punched screen. After that, the coarse-crushed glass pieces are ground (ball mill) and classified (air separator) to mean particle sizes ($d_{50}$) between 1 and 100 μm, preferably between 2 and 6 μm.

The porous glass particles preferentially contain mesopores (2 to 50 nm), but they may also contain micropores (<2 nm) and macropores (>50 nm). FIG. 1 represents a transmission electron microscope record of a glass particle in which the pore sizes are clearly visible. The porous glass particle shown there is only sized approx. 350 nm, so that the pores are clearly distinguishable under the transmission electron microscope.

The color-stable, antimicrobial glass powder is produced in the following way:

2.0 to 10.0 wt % of a soluble metal salt, preferably silver nitrate, zinc chloride or copper chloride, are solved in distilled water together with 0.5 to 10 wt % of a water-soluble ammonium bond, preferably ammonium nitrate, 80.0 to 96.0 wt % of the porous glass particles are put into a mixer, the solution of the metal salt(s) and the ammonium compound are introduced into the mixer by a nozzle, the components are mixed together for another 10 to 60 minutes, the mixture is subjected to a thermal treatment for 1 to 120 minutes at 300° C. to 330° C., the thermally treated mixture is chilled and subjected to a dry grinding process, if necessary, to deagglomerate the doped particles.

You may also use metal salts which are soluble in other solvents.

The metal ions are interstitially compounded in the pores of the glass particles. If you use silver nitrate and ammonium nitrate, a partial ion exchange will additionally take place with the sodium ions of the glass particles.

DESCRIPTION OF THE INVENTION

Examples

The invention is illustrated below with some examples in detail, but the invention is not to be construed as being limited to those examples.

Production of the Porous Glass Particles

A glass foam was produced from borosilicate glass of the chemical composition described above, using water vapour (2.5 grams per kilogram of molten glass) as a leavening agent in the single-screw extruder at a molten glass temperature of 880° C.

TABLE 3

Chemical composition of the borosilicate glass for the example

| Oxides | Content in wt % |
|---|---|
| $Na_2O$ | 9.91 |
| $K_2O$ | 2.91 |
| MgO | 0.57 |
| CaO | 2.52 |
| $Al_2O_3$ | 5.52 |
| $SiO_2$ | 57.7 |
| $B_2O_3$ | 10.9 |
| $Fe_2O_3$ | 0.12 |
| ZnO | 4.32 |
| BaO | 4.94 |
| $F_2$ | 0.42 |

The determination of the chemical glass composition (ISO 52340) is made via atomic absorption spectroscopy (AAS) or X-ray fluorescent analysis.

As a next step, the glass foam was coarse-crushed in a roll type crusher with a punched screen of 7 mm down to glass foam particles of ≤7 mm. After that, they were crushed to a mean particle size of 3.0 µm in a combined grinding and separating process (ball mill)—(particle size distribution: $d_{10}$=0.9 µm; $d_{50}$=2.9 µm; $d_{75}$=5.0 µm; $d_{90}$=7.2 µm and $d_{99}$<12.0 µm).

The particle size distribution was determined by means of laser diffraction in accordance with DIN ISO 1332-1. $D_{50}$ is the particle size where 50 percent of the particles are smaller or equal to the specified value.

The ph value of the porous glass particles was determined in a 10% aqueous solution at ambient temperature in accordance with DIN EN ISO 787-9. In deviation from the standard, the eluate was produced from 10 g glass powder and 90 g distilled water, however. The glass particles were now filtered, and the filtrate was measured concerning both ph value and conductivity, using the pH laboratory kit including a conductivity electrode (Hach Lange GmbH).

The content of moisture in the glass particles was determined in accordance with ISO 787-2 after 2 hours of drying in the recirculation unit at 105° C.

The following values were determined for the porous borosilicate glass powder of a $d_{50}$ of 2.9 µm used in the examples:

pH: 10.3
Conductivity: 0.7 mS/cm
Residual moisture: 0.4%.

Production of the Color-Stable, Antimicrobial, Porous Glass Particles 12.5 g silver nitrate (very pure, for synthesis, silver content 63.5%) and 15 grams of ammonium nitrate) were solved in 14 ml of distilled water. This was done with a heatable magnetic stirrer as the solvent action runs highly endothermally.

237.5 g of the porous glass particles of a $d_{50}$ of 2.9 µm were put into a plastic bowl. The porous glass particles were mixed in a laboratory agitator at low speeds (400 to 600 $min^{-1}$). The solution of silver nitrate and ammonium nitrate was then slowly added by drops into the bowl with the porous glass particles, always agitating the mixture.

Once the complete solution was filled in, the mixture was stirred for another 10 minutes.

The mixture was evenly distributed on a stainless steel sheet, the thickness of the layer being <1 cm. The filled layer was covered with a lid and put into the furnace that was preheated to 330° C. When the setpoint temperature of 330° C. was reached, the sheet remained in the furnace at 330° C. for another 45 minutes. The sheet was taken out of the furnace, and after a cooling period of 30 minutes approximately the color-stable, antimicrobial, porous glass particles could be removed from the sheet. After that, the dried, color-stable, antimicrobial, porous glass powder was deagglomerated in a toothed colloid mill KK 100.

The next step was the production of eluates from the color-stable, antimicrobial, porous glass particles.

In deviation from the standard DIN EN ISO 787-14, 10 grams of the glass particles were eluated in 90 g of distilled water. The glass particles were filtered and additionally centrifuged before the analysis in order to separate any floating matter. The filtrate was measured concerning both ph value and conductivity, using the pH laboratory kit including conductivity electrode (Hach Lange GmbH).

The ph value of the filtrate was 7.9, its conductivity 10.0 mS/cm. The silver ion content in the eluate was determined using the photometer DR 2800 (make Hach Lange GmbH) and the cuvette test LCK 354. The eluate had a silver content of 0.47 mg/l. The moisture content of the color-stable, antimicrobial, porous glass particles was determined in accordance with ISO 787-2 after 2 hours of drying in the recirculation unit at 105° C. and was 0.21%.

The proof that and if so, how many ammonium ions were in the glass particles doped with silver nitrate and ammonium nitrate, was carried out, on the qualitative side, by the blue discoloration of a universal indicator, and on the quantitative side, with a cuvette test in accordance with the standard method of the ISO 7150-1, DIN 38406 E5.

Description of the Test Arrangement for a Qualitative Determination of Ammonium Ions:

The product is presented in a watch-glass. ph paper is glued into a second watch-glass, using a few drops of water. When some drops of concentrated sodium hydroxide solution have been added, the watch-glass with the pH paper is slipped over the other glass (simulation of a micro gas chamber). After a short period, the ph paper discolors and reaches the alkaline zone (in the present case, it gets blue).

All products analysed to date, to which ammonium nitrate has been introduced, showed a positive qualitative reaction.

Description of the Test Arrangement for the Quantitative Determination of Ammonium Ions:

As ammonium ions are excellently soluble in water, we have used a cuvette test made by Hach Lange GmbH.

The cuvette test is available in 3 different concentration levels (47-130 mg/l, 2.0-47.0 mg/l and 0.015-2.0 mg/l). This is a standardized method in accordance with ISO 7150-1, DIN 38406 E5-1. It is the principle of this measurement that ammonium ions will react to hypochlorite ions and salicylate ions in the presence of sodium nitroprusside as catalyzer to become indophenol blue, at a pH value of 12.6. Primary amines are also detected and result in multiple findings. A 1000-fold surplus of urea is no interference.

The intensity of the indophenol blue coloration is measured with a photometer DR 2800, also made by Hach Lange GmbH.

An analysis is performed of a 10 percent aqueous eluate which after filtration and centrifugation is subjected to the chemical reaction described above, in a cuvette provided with a bar code.

The values thus determined are presented in Table 4. The results make clear what proportions of ammonium can be detected in the individual products.

achieved with shorter tempering periods, as the surface available for exchange is larger.

Example of Comparison Without Ammonium Nitrate

The same method was used to produce the antimicrobial, porous glass particles used for comparison which are not color-stable. No ammonium nitrate was used here. In this case, the ph value of the eluate was 9.9, the conductivity 4.1 mS/cm and the silver content 0.35 mg/l. It was possible to prove the antimicrobial effect of this product in a plaster over a period of approximately 4 years in an outdoor field test, where the plaster underwent heavy discoloration, however. In façade paints, the antimicrobial effect of these silver-doped, porous glass particles has also been proved in an outdoor test over a period of 24 months, where strong discoloration occurred as well.

Example of Color Tests in Plaster

A laboratory mixer was used to blend the color-stable, antimicrobial, porous glass particles claimed by the invention into a silicone resin plaster in a concentration of 1.0, 2.0 and 4.0 wt % (samples 1.1, 1.2 and 1.3). A laboratory mixer was used to blend the color-stable, antimicrobial, porous glass particles claimed by the invention into a silicone resin plaster in a concentration of 1.0, 2.0 and 4.0 wt % (samples V1, V2 and V3).

For the comparison of the different colors, a plaster sample without argentiferous, antimicrobial, porous glass particles was used (V0). The plaster samples were applied to plastic plates, with a thickness of the layer of ca. 2.0 mm.

These samples were stressed in various manners in order to get figures for a long-term behaviour. The first set of samples was only dried at ambient temperature.

A second set of samples was stored in the laboratory for 5 weeks.

With the third set of samples, the sample sheets were inclined at a 90 degree angle in a southerly direction, and left exposed to the prevailing climatic situation for 10 weeks.

| Item | Sample | pH value | LF (mS/cm) | Ag+ (mg/l) | $NH_4$ (mg/l) | $NH_4NO_3$ (g/assay) | Tempering time/ Temperature Duration (min) | ° C. |
|---|---|---|---|---|---|---|---|---|
| 1) | TROVOguard B-K3-040309 Charge No. 22-02-16-S40-An6-KR7-K3 | 8.75 | 6.93 | 0.42 | 1.05 | 400 | 45 | 330 |
| 2) | TROVOguard B-K3-040306 Charge No. 23-02-16-S42-An6-KR7-K3 | 7.9 | 8.95 | 0.44 | 1.11 | 600 | 45 | 330 |
| 3) | TROVOguard B-K3-040310 Charge No. 15-11-S35-An0-KR6-K3-ZnO10 | 7.7 | 9 | 0.46 | 1.09 | 600 | 45 | 330 |
| 4) | TROVOguard B-K3-040306 Charge No. 15-07-S35-AnO-KR6-K3 | 7.7 | 10 | 0.49 | 1.27 | 600 | 45 | 330 |
| 5) | TROVOguard B-K2-040301 Charge No. 15-11-S39-An3-KR4-K2 | 8.4 | 10.2 | 0.43 | 1.74 | 600 | 5 | 330 |

Contrary to the schools of thought and discussions with chemical engineers, a share of 0.1 to 0.2% of ammonium ions can be detected in the modifed glass particles obtained at temperatures of 33° C. with ammonium nitrate, where in case of smaller particles, cf. item 5 in Table 4, a particle with the mean particle size of 2 μm had a higher ammonium ion content than in the items 1-4 of the variations with a mean particle size of 3 μm. If the particles are smaller, both the silver ion exchange and the ammonium ion exchange are A fourth set of samples was exposed to alternatingly UV light and humidity at high temperatures in the QUV test for 10 days. A lamp was used here which realises the best possible simulation of insolation in the critical short-wave UV range between 365 nm and the solar energy limit of 295 nm. The radiation peak was at 340 nm.

The colors were compared using the method of the CIELAB color space in order to determine color differences between a reference sample (V.0—zero sample without glass particles) and the comparison samples (samples with argentiferous glass particles and samples with argentiferous glass particles and ammonium). The underlying color model is described in EN ISO 11664-4.

The model of the CIELAB color space has three axes in order to represent the color differences mathematically. The brightness axis L with a range between L=0 for black and L=100 for white, arranged in the model vertically to the color axes, running through the zero point. The a axis (da value) describes the green and red content of a color, where negative values are green and positive values red. The b axis (db value) describes the blue and yellow content of a color, where negative values are blue and positive values yellow.

The value dE mathematically defines the total color difference between two samples with the formula:

$$dE=\sqrt{dL^2+da^2+db^2}$$

Tables 5 and 6 include the sample V.0, which is the comparison sample each for the plaster without antimicrobial glass powder.

For comparison purposes, this sample was also exposed to the various storage methods and compared afterwards with the samples containing silver-doped glass powder stored in the same way.

The samples in Table 5, V.1 to V.3, are plasters produced without ammonium nitrate, which are equipped with the silver-doped glass particles (comparison).

The samples 1.1 to 1.3 in Table 6 are plasters produced with ammonium nitrate, which are equipped with the silver-doped glass particles. In each case, samples of the plaster were mixed with 1.0, 2.0 and 4.0 wt % of the argentiferous glass particles and then applied to plastic plates.

TABLE 5

Color differences of plaster with silver-doped glass powder without ammonium nitrate (comparison)

| Name | Content of silver-doped glass powder without ammonium nitrate | Color difference to the sample V.0 | | |
|---|---|---|---|---|
| | | dE | dL | da | db |
| Examination condition | | After drying | | | |
| Sample V.0 | without | | | | |
| Sample V.1 | 1% | 2.59 | −2.51 | 0.52 | −0.34 |
| Sample V.2 | 2% | 4.51 | −4.43 | 0.73 | −0.46 |
| Sample V.3 | 4% | 6.93 | −6.83 | 1.13 | −0.26 |
| Examination condition | | 5 weeks in the lab | | | |
| Sample V.0 | without | 0.14 | 0.13 | | −0.03 |
| Sample V.1 | 1% | 0.11 | −0.10 | | 0.04 |
| Sample V.2 | 2% | 0.24 | −0.13 | | 0.19 |
| Sample V.3 | 4% | 0.85 | −0.43 | | 0.71 |
| Examination condition | | 10 weeks in weather at 90° angle | | | |
| Sample V.0 | without | 0.46 | −0.07 | | −0.45 |
| Sample V.1 | 1% | 2.31 | −1.75 | | 1.48 |
| Sample V.2 | 2% | 4.05 | −2.54 | | 3.12 |
| Sample V.3 | 4% | 5.18 | −3.34 | | 3.90 |
| Examination condition | | 10 days QUV 340 mm | | | |
| Sample V.0 | ohne | 0.20 | 0.19 | | −0.07 |
| Sample V.1 | 1% | 5.54 | −2.25 | | 5.05 |
| Sample V.2 | 2% | 8.31 | −3.54 | | 7.44 |
| Sample V.3 | 4% | 9.38 | −4.64 | | 8.07 |

TABLE 6

Color differences of plaster with silver-doped glass powder with ammonium nitrate (patent claim)

| Name | Content of silver-doped glass powder with ammonium nitrate | Color difference to V-0 | | |
|---|---|---|---|---|
| | | dE | dL | da | db |
| Examination condition | | After drying | | | |
| Sample V.0 | without | | | | |
| Sample 1.1 | 1% | 0.83 | −0.75 | 0.15 | 0.33 |
| Sample 1.2 | 2% | 1.13 | −1.06 | 0.22 | 0.35 |
| Sample 1.3 | 4% | 2.37 | −2.22 | 0.47 | 0.72 |
| Examination condition | | 5 weeks in the lab | | | |
| Sample V.0 | without | 0.05 | 0.01 | | 0.05 |
| Sample 1.1 | 1% | 0.08 | 0.06 | | 0.03 |
| Sample 1.2 | 2% | 0.20 | −0.17 | | 0.06 |
| Sample 1.3 | 4% | 0.38 | −0.37 | | −0.07 |
| Examination condition | | 10 weeks in weather at 90° angle | | | |
| Sample V.0 | without | 0.42 | −0.17 | | −0.38 |
| Sample 1.1 | 1% | 0.23 | −0.17 | | 0.16 |
| Sample 1.2 | 2% | 1.23 | −0.32 | | 1.18 |
| Sample 1.3 | 4% | 2.51 | −0.34 | | 2.48 |
| Examination condition | | 10 days QUV 340 mm | | | |
| Sample V.0 | without | 0.31 | −0.28 | | 0.13 |
| Sample 1.1 | 1% | 0.33 | −0.25 | | 0.18 |
| Sample 1.2 | 2% | 1.24 | −0.22 | | 1.21 |
| Sample 1.3 | 4% | 2.20 | −0.82 | | 2.04 |

TABLE 7

Assessment scale for color differences

| Extent of color difference | Evaluation |
|---|---|
| 0 | No noticeable difference |
| 1 | Very small, just noticeable difference |
| 2 | Small, but distinctly noticeable difference |
| 3 | Moderate difference |
| 4 | Considerable difference |
| 5 | Very large difference |

The plaster samples 1.1 to 1.3 with the glass particles produced by using silver nitrate and ammonium nitrate show significantly lower color differences than the samples V1 to V3 with the glass particles produced using silver nitrate.

If you consider the fact that the human eye is unable to notice color differences lower than a difference value of 1 (cf. Table 7), no sample of sample 1.1 presents a visible color difference. The values are sometimes even under the reference values of the sample without argentiferous glass particles.

The quantity used, namely 1.0 wt % of the color-stable, antimicrobial, porous glass particles of this sample will suffice for most applications, corresponding to a silver ion content in the plaster of around 300 ppm.

With the samples with 2.0 and 4.0 wt % of the argentiferous glass powder, there are large differences between the comparison samples V2 and V3, on the one hand, and the samples 1.2 and 1.3 on the other hand. The discoloration of the plaster by silver ions is increased by 100% to 400% if you do not use any ammonium nitrate.

The sample of the color-stable, antimicrobial, porous glass particles produced in the example was subjected to a long-term release of silver ions, by producing and analysing multiple eluates.

The first eluate was produced from 20 g color-stable, antimicrobial, porous glass particles suspended in 180 g of distilled water. The glass particles were filtered off, and dried in the recirculation unit at 105° C. for 2 hours. The filtered matter was centrifuged before the analysis in order to separate any floating matter.

The filtrate was measured concerning both ph value and conductivity, using a pH laboratory kit including a conductivity electrode (Hach Lange GmbH).

The silver ion content of the filtrate was determined using the photometer DR 2800 (Hersteller Hach Lange GmbH) and the cuvette test LCK 354. The dried glass particles were again eluated in distilled water in the mass ratio 1:9, after which the glass particles were filtered off and dried. A number of 5 eluates in total were produced according to this pattern, and analysed.

TABLE 8 pH value and conductivity of the multiple eluates of color-stable, antimicrobial, porous glass particles according to the claims of the invention

| | Quantity used | | Eluate | | |
|---|---|---|---|---|---|
| No. | Color-stable, antimicrobial, porous glass particles in g | Distilled water in g | pH | Conductivity in mS/cm | $Ag^+$ in mg/l |
| 1 | 20.00 | 180.00 | 7.9 | 9.9 | 0.48 |
| 2 | 19.93 | 179.37 | 8.0 | 1.0 | 0.39 |
| 3 | 19.68 | 177.12 | 8.1 | 0.15 | 0.26 |
| 4 | 19.08 | 171.72 | 7.8 | 0.07 | 0.12 |
| 5 | 17.04 | 153.36 | 7.6 | 0.12 | 0.08 |

The release of silver ions from the color-stable, antimicrobial, porous glass particles is even sufficiently high after 5 eluates to achieve an antimicrobial effect. 0.235 grams of silver were in total liberated with the 5 eluates made of the color-stable, antimicrobial, porous glass particles. If you consider the quantity of used silver of 0.635 grams, the calculation shows that only 37% of the silver was liberated under these extreme test conditions, which means that the antimicrobial effect will continue for a longer period.

The invention claimed is:

1. A color-stable, antimicrobial glass powder having characteristics of having been obtained by partial ion exchange at a temperature of 300° C. to 350° C. and an exchange time of 1 to 120 minutes, the glass powder comprising a mixture of:
   porous glass particles having micropores and macropores made of borosilicate glass having characteristics of continuously foaming by extrusion having a $Fe_2O_3$ content <0.2 wt % and characteristics of subsequently comminuting an obtained glass foam by dry grinding to average particle sizes of 1.0 to 8.0 μm;
   ammonium nitrate forming 0.1% to 0.2% ammonium ions in the porous glass particles at the parameters described above; and
   antimicrobial metal ions from dissolved metal salts, the metal ions being at least one of silver or zinc or copper ions.

2. The color-stable, antimicrobial, porous glass powder according to claim 1 being used in polymers, silicones, paints, plasters or cosmetic products in quantities of 0.1 to 20.0 wt % to achieve an antimicrobial effect.

3. The color-stable, antimicrobial, porous glass powder according to claim 2, wherein the polymers are formed by two or more polymers or contain polymerisates having elastic characteristics of rubber.

4. The color-stable, antimicrobial, porous glass powder according to claim 2, wherein the polymers are compounds containing additional fillers, aggregates or coloring agents.

5. The color-stable, antimicrobial, porous glass powder according to claim 2, wherein the glass powder used in polymers form antimicrobially equipped polymers used to produce antimicrobially equipped molded parts, film or fibers.

6. The color-stable, antimicrobial, porous glass powder according to claim 2 wherein the silicones are damp-proof silicones.

7. The color-stable, antimicrobial, porous glass powder according to claim 1 being used in starting materials of polymers, including polymerizable or curable monomers or polymerizable or curable prepolymers or polymerizable or curable polymers.

8. The color-stable, antimicrobial, porous glass powder according to claim 1 being used in polymers, silicones, paints, plasters or cosmetic products in quantities of 0.1 to 20.0 wt % to achieve an antimicrobial effect, with a moisture absorption at 23° C. and 50% relative humidity being ≥0.2 wt %.

9. The color-stable, antimicrobial, porous glass powder according to claim 1 being used in paints and plasters in quantities of 0.1 to 20.0 wt % to achieve an antimicrobial effect and being water vapor permeable.

10. A method for the production of a color-stable, antimicrobial glass powder, the method comprising the following steps:
    carrying out a partial ion exchange at a temperature of 300° C. to 350° C. and an exchange time of 1 to 120 minutes; and
    providing a mixture of:
       porous glass particles having micropores and macropores made of borosilicate glass continuously foamed by extrusion having a $Fe_2O_3$ content <0.2 wt %, and subsequently comminuting an obtained glass foam by dry grinding to average particle sizes of 1.0 to 8.0 μm;
       ammonium nitrate as a color stabilizer forming 0.1% to 0.2% ammonium ions in porous glass particles at a temperature of 300° C. to 350° C. and an exchange time of 1 to 120 minutes; and
       antimicrobial metal ions from dissolved metal salts, the metal ions being at least one of silver or zinc or copper ions.

* * * * *